United States Patent [19]

Miller et al.

[11] Patent Number: 4,608,094
[45] Date of Patent: Aug. 26, 1986

[54] METHOD OF PRODUCING TURBINE DISKS

[75] Inventors: John A. Miller, Jupiter; Roy L. Athey, North Palm Beach, both of Fla.

[73] Assignee: United Technologies Corporation, Hartford, Conn.

[21] Appl. No.: 682,968

[22] Filed: Dec. 18, 1984

[51] Int. Cl.$^4$ ............................................... C22F 1/10
[52] U.S. Cl. .......................... 148/11.5 N; 148/12.7 N; 148/410; 148/428; 148/39
[58] Field of Search ..................... 148/11.5 N, 12.7 N, 148/410, 428, 39

[56] References Cited

U.S. PATENT DOCUMENTS 4,401,480  8/1983  Crombie, III ................ 148/11.5 N Primary Examiner—R. Dean
Attorney, Agent, or Firm—Charles E. Sohl

[57] ABSTRACT

A method is described for producing metallic articles, especially turbine disks, which have a hot-worked structure in one region and a warmworked structure in another region and thereby have properties which differ in different regions. The method comprises an initial hot-working step, an intermediate heat treatment step and a final warm-working step.

6 Claims, 3 Drawing Figures

METHOD OF PRODUCING TURBINE DISKS

TECHNICAL FIELD

This invention relates to metal working processes and to processes for producing articles having different mechanical properties in different portions. This invention relates specifically to the production of superalloy turbine disks.

BACKGROUND ART

It is generally the case that metallic articles are called upon to have a combination of properties, and often the property requirements vary from one portion of the article to another. In some cases a single material can satisfy the various property demands throughout the article. In other cases, however, it is not possible to achieve all material requirements in an article with a single material. In such cases it is known to use composite articles in which one portion of the article is fabricated from one material and a second portion is fabricated from another material and the various materials are selected on the basis of the properties required for the various portions of the article.

Occasionally, however, the use of composite articles is not possible. For example, in a gas turbine engine the disks which support the blades rotate at a high speed in a relatively elevated temperature environment. The temperatures encountered by the disk at its outer or rim portion are elevated, perhaps on the order of 1500° F. whereas in the inner bore portion which surrounds the shaft upon which the disk is mounted, the temperature will typically be much lower, less than 1000° F. Typically, in operation, a disk may be limited by the creep properties of the material in the high temperature rim area and by the tensile properties of the material in the lower temperature bore region. Since the stresses encountered by the disk are in large measure the result of its rotation, merely to add more material to the disk in areas where inadequate properties are encountered is not generally a satisfactory solution, since the addition of more material increases the stresses in other areas of the disk. There have been proposals to make the rim and bore portions of the disk from different materials and to bond these different materials together. This is not an attractive proposition, largely as a result of the difficulties encountered in bonding materials together in such a fashion as to reliably resist high stresses.

Accordingly, it is an object of the invention to provide a metallic article of a single alloy composition having properties which vary from one portion of the article to another.

It is a further object of the invention to provide a metallic article of a single composition in which one portion of the article has a hot-worked structure and another portion of the article has a cold-worked or a warm-worked structure.

Another object of the invention is to describe a gas turbine disk having optimum tensile properties in its bore region and optimum creep properties in its rim region.

Yet another object of the invention is to describe a method for producing the previously described articles.

DISCLOSURE OF INVENTION

These and other objectives are achieved by forming the article from a starting blank using a hot-working operation to form the article to essentially its final geometry in one portion but leaving the article in an oversized condition in another portion. The article is then heat treated, typically near the gamma prime solvus, to produce a coarse grain structure which is more creep resistant than fine grain material. Warm working is then employed to reduce the oversized portion to the desired final configuration and to produce a different microstructure in the warm-worked region than that observed in the previously produced hot-worked and heat treated region.

The invention was conceived and developed with respect to turbine disks formed from nickel base superalloys of the composition described in Table I. However, it will be appreciated that the benefits produced by the invention can be applied to a wide variety of metallic materials by those skilled in the art.

TABLE I

|  | Broad Range | Nominal IN 100 |
| --- | --- | --- |
| Cr | 8–21% | 12.4 |
| Co | 10–16% | 18.5 |
| Mo | 2.5–6.0% | 3.2 |
| Al | 1–6% | 5.0 |
| Ti | 2.5–5.0% | 4.3 |
| C | .05–.2% | .07 |
| B | .015–.035% | .02 |
| Zr | .04–.10% | .06 |
| V | 0–1% | .8 |
| Hf | 0–1% | — |
| Ta | 0–5% | — |
| Cb | 0–5% | — |
| (W + Ta + Cb + Mo) | 2.5–10% | 3.2 |
| Ni | balance | Balance |

In the case of the nickel base superalloys, the article may be direct aged following the warm-working step by cooling to room temperature at a controlled rate, or by cooling directly to room temperature and then reheating to one or more aging temperatures, to cause precipitation of the strengthening gamma prime phase. The resultant article will have a warm-worked structure in one portion and a coarse grain hot-worked structure in another portion. The coarse grain hot-worked portion is adapted to resist creep stresses, while the warm-worked portion is adapted to resist tensile stresses. The creep resistant hot-worked region is adapted to operate at elevated temperatures on the order of 1500° F. and to resist creep at these temperatures while the warm-worked structure is adapted to resist tensile stresses at temperatures below about 1000° F.

The invention is particularly adapted to the production of gas turbine engine disks in which the rim region operates at elevated temperatures and is often limited by the creep properties of the material and the bore region operates at cooler temperatures and is often limited by the tensile properties of the material.

The foregoing and other objects, features and advantages of the present invention will become more apparent from the following description of preferred embodiments and accompanying drawings.

BEST MODE FOR CARRYING OUT THE INVENTION

The invention will be described with regard to the fabrication of a gas turbine disk from a nickel base superalloy known as IN 100 whose nominal composition is presented in Table I. The object is to produce a disk having a warm-worked structure in its bore area to provide high tensile properties and a coarse hot-worked structure in its rim region to produce good creep properties.

Figure 3:
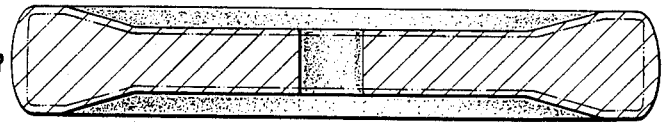
FIG. 3 shows a final disk configuration.

FIG. 3 shows the desired final configuration of the disk, the solid lines show the desired final forging shape, and the phantom lines illustrate a typical disk shape after machining.

Figure 1:
FIG. 1 shows a cross section of a typical preform from which a disk is formed.
Figure 2:
FIG. 2 shows a cross section of an intermediate disk form.

FIG. 1 shows a starting configuration which is hot-worked in shaped dies to the configuration shown in FIG. 2. The FIG. 1 configuration may comprise forged material, consolidated powder metal, or a casting. The FIG. 2 configuration has an oversize bore to accommodate material flow during forging. The hot-working operation will be performed at a temperature typically for the alloy in question of 1975° F.–2000° F. at a strain rate of about 0.1 in./in. to 0.5 in./in per minute. The process described in U.S. Pat. No. 3,519,503 is preferably employed. The contents of this patent is incorporated herein by reference. This process is one of essentially isothermal forging performed under conditions which produce and maintain temporary condition of low strength and high ductility in the material being worked. The configuration shown in FIG. 2 is designed to provide an oversized area in the bore region, an area which requires a reduction of at least about 25% in thickness to achieve the desired final configuration. A 25% reduction in thickness will produce warm-working throughout the entire thickness of the bore region.

The hot-worked intermediate article is then heat treated at about 2100° F. for about 4 hours to produce grain coarsening. Working of the bore region area is performed at a temperature of about 1700° F. at a strain rate greater than about 0.1 in./in./minute. (The forces required will be substantially greater than those required for the previous hot-worked operation.) The rim region is in a hot-worked condition has a coarse grain structure and a yield strength of about 155 ksi, and is adapted to resist creep. The bore region is in a warm-worked condition and has a yield strength of about 180 ksi. Accordingly, the rim region is adapted to resist creep deformation and the bore region is adapted to resist tensile loads of the type which can cause failure by bursting.

It should also be observed that while the disk rim operates at a higher temperature than the bore region neither the bore or rim encounters a temperature sufficient to cause recrystallization or grain growth.

For a particular alloy system the distinction between hot working and warm working is that in the hot-working step dynamic recrystallization occurs at a rate such that the final structure after the hot-working process contains no increased dislocation density such as that which is produced by cold or warm working. A warm-worked structure does contain a substantially increased dislocation density which is responsible for the changes in various mechanical properties. The recrystallization temperature is not an exact quantity but rather depends upon the deformation conditions and the prior history of the alloy. However, in the case of the precipitation hardening systems the temperature which separates warm working from hot working will typically be in the vicinity of the gamma prime solvus temperature since above the gamma prime solvus the strengthening gamma prime phase dissolves and permits ready motion of dislocations and the movement of recrystallized grain boundaries.

The strength of the article may be increased by direct aging from the warm-working temperature. Whereas in order to develop the optimum mechanical properties in a precipitation hardening alloy system such as the nickel base alloys, it is desirable to solution treat the alloy near the gamma prime solvus so as to partially or completely dissolve the precipitate phase and then to reprecipitate this phase in a controlled morphology by aging at one or more temperatures below the precipitate solvus, in case of the present invention such a full solution treatment is not possible since to fully solution the precipitate would result in the recrystallization of the warm-worked region converting the entire disk to a coarse grained, recrystallized type structure. However, a substantial portion of the strength available by the complete precipitation hardening sequence can be obtained by direct aging from the warm-working temperature. Thus, for example, after the deformation step at 1700° F. the disk can be cooled to room temperature and then aged at an appropriate temperature between 1100° and 1400° F. for maximum bore strength.

Another option to increase properties is to heat treat the rim portion to cause further grain coarsening. This may be achieved using localized heating of the rim portion to coarsen the rim grain structure.

Although this invention has been shown and described with respect to a preferred embodiment, it will be understood by those skilled in this art that various changes in form and detail thereof may be made without departing from the spirit and scope of the claimed invention.

We claim:

1. A method of producing a nickel base superalloy article having properties which vary, in a controlled fashion, from one portion of the article to another portion of the article including the steps of:
   a. hot working the entire article to a first geometry which approximates the desired final geometry except for portions of the article which are at least about 25% oversized compared to the desired final geometry;
   b. heat treating the article to increase the grain size;
   c. warm working the oversized portions of the article to final shape
   whereby the warm-worked portions of the article have enhanced tensile properties and the hot-worked portions of the article have enhanced creep properties.

2. A method as in claim 1 in which, after warm working, the article is direct aged, by heat treating to cause controlled precipitation of precipitate phases.

3. A method as in claim 1 in which the article is a gas turbine engine disk and the warm-worked portion of the article comprises the bore portion.

4. A method as in claim 1 in which the alloy comprises 8–21% Cr, 10–16% Co, 2.5–6.0% Mo, 1–6% Al, 2.5–5.0% Ti, 0.05–0.2% C, 0.015–0.035% B, 0.04–0.10% Zr, 0–1.0% V, 0–1.0% HF, 0–5% W, 0–5% Ta, 0–5% Cb, 2.5–10% (W+Ta+Cb+Mo), balance essentially Ni.

5. A method as in claim 1 in which, subsequent to the warm-working operation the hot-worked region is locally heated to produce grain coarsening.

6. A nickel base superalloy gas turbine engine disk fabricated from an alloy consisting essentially of 8–21% Cr, 10–16% Co, 2.5–6.0% Mo, 1–6% Al, 2.5–5.0% Ti, 0.05–0.2% C, 0.015–0.035% B, 0.04–0.10% Zr, 0–0% V, 0–1.0% Hf, 0–5% Ta, 0–5% Cb, 2.5–10% (W+Ta+Cb+Mo), balance essentially Ni having a rim portion with a hot-worked structure and a bore portion with a warm-worked structure;

whereby the disk is adapted to resist creep in its rim region and tensile forces which cause bursting in its bore region.

* * * * *

UNITED STATES PATENT AND TRADEMARK OFFICE
CERTIFICATE OF CORRECTION

PATENT NO.   : 4,608,094

DATED        : August 26, 1986

INVENTOR(S)  : John A. Miller et al

It is certified that error appears in the above-identified patent and that said Letters Patent is hereby corrected as shown below:

Column 5, line 7:    after "Zr," change "0-0%" to --0-1.0%--

Column 5, line 8:    after "Hf," insert --0-5% W,--

Signed and Sealed this

Eleventh Day of November, 1986

Attest:

DONALD J. QUIGG

Attesting Officer         Commissioner of Patents and Trademarks